(12) United States Patent
Lethbridge

(10) Patent No.: US 7,750,845 B2
(45) Date of Patent: Jul. 6, 2010

(54) POSITIONING DEVICE AND A METHOD OF OPERATING THEREOF

(75) Inventor: Simon Lethbridge, Thatcham (GB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 244 days.

(21) Appl. No.: 12/046,945

(22) Filed: Mar. 12, 2008

(65) Prior Publication Data

US 2008/0224924 A1    Sep. 18, 2008

Related U.S. Application Data

(60) Provisional application No. 60/896,809, filed on Mar. 23, 2007.

(30) Foreign Application Priority Data

Mar. 15, 2007    (EP)    .................................. 07104187

(51) Int. Cl.
*G01S 19/05* (2010.01)
*G01S 19/25* (2010.01)
*H04L 7/00* (2006.01)

(52) U.S. Cl. .............................. 342/357.1; 342/357.09; 375/354

(58) Field of Classification Search .............. 342/357.1, 342/357.09; 375/354
See application file for complete search history.

(56) References Cited

U.S. PATENT DOCUMENTS

| 6,448,927 | B1 | 9/2002 | Ishigaki et al. |
| 6,865,380 | B2 | 3/2005 | Syrjärinne |
| 6,925,292 | B2 | 8/2005 | Syrjärinne et al. |
| 2006/0238417 | A1 | 10/2006 | Jendbro et al. |

FOREIGN PATENT DOCUMENTS

| EP | 1229409 | 7/2002 |
| EP | 1720030 | 8/2006 |
| JP | 2006162265 | 6/2006 |
| WO | WO2006006463 | 1/2006 |

OTHER PUBLICATIONS

Jari Syrjärinne, et al., "Analysis of GPS Time-Transfer Accuracy in GSM and UMTS Networks and Possibilities to Improve Safety", ION GPS 2002, Sep. 24-27, 2002, pp. 184-191, Portland, OR.

*Primary Examiner*—Thomas H Tarcza
*Assistant Examiner*—Fred H Mull
(74) *Attorney, Agent, or Firm*—Michael G Cameron

(57) ABSTRACT

A positioning unit and telecommunications unit wherein a reference time value from is requested from a telecommunications network to start the positioning receiver. A strobe is scheduled to be transmitted from the telecommunications unit to the positioning receiver when the positioning receiver is armed. A current and predefined value of the counter is compared and the strobe is generated when the counter current value equals the predefined value. The strobe time of generation is recorded in relation to a structure of the signal transmitted by the digital telecommunications network in the current serving cell. The reference time value from the telecommunications network is received, wherein the reference time value is related to a structure of the signal transmitted by the network. The accurate time of generation of the strobe based on said reference time value is calculated transmitted to said positioning unit.

25 Claims, 3 Drawing Sheets

POSITIONING DEVICE AND A METHOD OF OPERATING THEREOF

This application claims the benefit of U.S. Provisional Application No. 60/896 809, filed Mar. 23, 2007, the disclosure of which is fully incorporated herein by reference.

FIELD OF THE INVENTION

The present invention relates to wireless communications devices with implemented positioning nodule, in general, and in particular to time synchronisation of the positioning module and an external reference time source using fine time assistance.

BACKGROUND OF THE INVENTION

With development of mobile telecommunications systems and mobile telecommunications devices it is known to provide mobile phones with additional functionalities. These additional functionalities include digital cameras, mp3 players as well as satellite navigation based on GPS (Global Positioning System) system.

There are two main application of the satellite navigation implemented in mobile phones. In many situations it is desirable to locate users who are making emergency calls. This allows police, ambulance or fire brigade services to be dispatched to the location of the incident determined on the basis of the location of the user making a call. It is easier to understand the importance of this feature bearing in mind that in many cases the user making the call can be an accidental witness not knowing the exact location of the incident. In this scenario a network operator makes a request to the telephone via a network infrastructure and the telephone responds to the request. In the first step the GPS receiver of the phone is powered-up and then location of the phone is determined and finally transmitted this back to the operator. The other important application of the location functionality in a mobile phone is providing the user with details of his/her location. In this scenario it is the mobile phone user that makes the request to the positioning module of the telephone to determine its location. This can be useful, for example, when ordering a taxi or when the user wants to find out what, so called, points of interest (e.g. museums, clubs, etc.) are nearby.

Important factor that must be considered in designing portable devices like mobile phones equipped with GPS receivers is power consumption of the GPS receivers, which during GPS signal acquisition and tracking, and navigation processing can be high. In order to save the battery capacity the GPS receiver is switched off for most of the time and powered-up only when requested. The undesirable effect of that is tong period of time required before the position is determined, this is called time to first fix (TTFF).

Wireless signals concurrently transmitted from satellites at known locations are used in a process of calculating position of a GPS receiver. The GPS receiver receives the signals from satellites within its view of the sky. The GPS receiver measures the distance between itself and at least three GPS satellites by measuring time delay between transmission and reception of each GPS radio signal. Having the positions of three GPS satellites and distances between the GPS receiver and each of the three satellites the receiver calculates its position using trilateration. Accuracy of the calculations depends on accuracy of measurement of time. For the calculations it is necessary to know the time of transmission and the time of reception of the GPS signal. This allows calculating the distance using the known speed of the signal (speed of light). The clocks installed in satellites are extremely accurate and stable atomic clocks. The drawback of atomic clocks is that they are also very expensive. The clocks implemented in GPS receivers are based on quartz oscillators and they are not as accurate as the ones installed in satellites. Their accuracy can be affected by various factors like temperature, ageing, etc. Therefore, in order to obtain required accuracy the receiver's clock errors must be corrected (clocks must be synchronised)

One possible method, known in the art is to use a fourth satellite to synchronize the clocks. This method can be in many situations difficult to implement. First, it requires four satellites to be in line of sight of the receiver and the signals from all four satellites must be strong enough to allow for the calculation. In some environment, especially in urban areas where view of the sky is blocked by tall buildings it is not possible to receive signals from four satellites. When the signal is too weak it is impossible to demodulate it and retrieve from the signal all the necessary data (e.g. position of the satellite) without error. Second, the process of synchronization of clocks using four satellites is a very lengthy one and with customers demanding shorter and shorter times to first fix is not always suitable for determining location of a caller in emergency situations.

There is known in the art, European patent EP1229409 a solution that uses assistance data from a cellular telecommunications network in order to assist in synchronizing the clocks. However, operations as in the invention now to be described are neither disclosed nor suggested in the prior art document.

A disadvantage of the solution known in the art using assistance data is that it has an additional delay in scheduling a timing strobe from the radio access stack and in some cases the synchronisation is stopped as a result of cellular handover.

Hence, an improved device for determining location and a method of its operation would be advantageous and in particular one that allows reducing time to first fix.

SUMMARY OF THE INVENTION

Accordingly, the invention seeks to prefer-ably mitigate, alleviate or eliminate one or more of the disadvantages mentioned above singly or in any combination.

According to a first aspect of the present invention there is provided a method of operating a device comprising a positioning unit and a telecommunications unit.

The method of operating a device according to the first aspect of the present invention comprises requesting a reference time value from a digital telecommunications network and starting-up a positioning receiver. When the starting-up of the positioning receiver is initiated a strobe for transmission from the telecommunication unit to the positioning receiver is scheduled. This scheduling occurs before a response is received from the network. The scheduling of the strobe is carried out by associating said strobe with a predefined value of a first counter in a way that the strobe is transmitted when the positioning receiver is armed. In order to generate the strobe at the scheduled time a comparator compares a current value of the first counter with said predefined value of the first counter and generates said strobe when said current value of the first counter equals said predefined value of the first counter. In the next step the time of generation of said strobe is recorded in relation to a structure of the signal transmitted by said digital telecommunications network in the current serving cell.

The method further comprises receiving said reference time value from said digital telecommunications network, wherein said reference time value is related to a structure of the signal transmitted by said digital telecommunications network in the current serving cell. In the following step the accurate time of generation of said strobe based on said reference time value is calculated and then transmitted to the positioning unit.

The method further comprises calculation of location of the device based on radio signals received from positioning system transmitters, wherein preferably the radio signals are transmitted from satellites of GPS system.

Also preferably, substantially simultaneously with the starting-up of the positioning receiver a timer is started and after expiration of the timer the step of scheduling the strobe is executed. The timer value is chosen so that the strobe is generated only when the positioning receiver is ready to receive it i.e. it has completed startup.

According to a second aspect of the present invention there is provided a device comprising a positioning unit and a telecommunications unit. Said positioning unit comprises a positioning receiver and a positioning application server connected to at least one radio access stack. The positioning application server is adapted to start-up the positioning receiver, upon a request to determine location, and to request obtaining reference time from a digital telecommunications network. The radio access stack comprises a scheduler and is connected to a timing generator comprising a comparator. The scheduler is adapted to configure the comparator, of the timing generator connected to an active radio access stack, to generate a strobe at a predefined value of a first counter and to transmit said strobe to the positioning receiver.

Preferably, in order to ensure that the strobe is generated when the positioning receiver is fully armed, the device also comprises a timer that is connected to the positioning application server.

The radio access stack also records local time of said strobe generation. The term radio access stack, also referred in the art as a protocol stack or a communications stack, is well known and clear for one skilled in the art. In short it may be described as a software implementation of a computer networking protocol suite, wherein the suite is the definition of the protocols, and the stack is the software implementation of them. The device is adapted to calculate the reference time of said strobe generation based on said recorded local time and the reference time value, also known as reference time assistance data and consisting of a cellular time stamp, a cell identifier and a GPS time stamp, once it is received from the network. The positioning unit is adapted to calculate the location of the device based on radio signals received from transmitters of a positioning system and the accurate (reference) time of said strobe generation.

Said positioning application server is adapted to calculate the reference time of said strobe generation or alternatively it is said active radio access stack that is adapted to calculate said reference time.

If the device comprises more than one radio access stack, for example GSM (Global System for Mobile communications) and WCDMA (Wideband Code Division Multiple Access) access stacks, a multiplexer may be connected between the timing generators and the positioning receiver.

According to a third aspect of the present invention there is provided a computer program product stored on a computer readable medium that is adapted to be executed on a computerised apparatus comprising a positioning unit and a telecommunications unit. Said computer program product, when executed on said computerized apparatus, is adapted to request reference time from a digital telecommunications network and to start-up a positioning receiver. When the starting-up of the positioning receiver is initiated the computer program product schedules a strobe for transmission from the telecommunications unit to the positioning receiver. The scheduling of the strobe is carried out by associating said strobe with a predefined value of a first counter in a way that the strobe is transmitted when the positioning receiver is armed. In order to generate the strobe at the scheduled time a comparator compares a current value of the first counter with said predefined value of the first counter and generates said strobe when said current value of the first counter equals said predefined value of the first counter. In the next step the time of generation of said strobe is recorded in relation to a structure of the signal transmitted by said digital telecommunications network in the current serving cell. The method carried out by the computer program product further comprises receiving said reference time value from said digital telecommunications network, wherein said reference time value is related to a structure of the signal transmitted by said digital telecommunications network in the current serving cell. In the following step the accurate time of generation of said strobe based on said reference time value is calculated and then said accurate time of generation of said strobe is transmitted to the positioning unit.

The computer program product when executed on a computerised apparatus is further adapted to calculate the location of the device based on radio signals received from positioning system transmitters.

Preferably, the computer program product is further adapted to substantially simultaneously with the starting-up of the positioning receiver to start a timer and after expiration of the timer to schedule the strobe.

Further features of the present invention are as claimed in the dependent claims.

The present invention beneficially allows for reducing latency in the fine time assistance data procedure by sending a timing strobe to the positioning receiver in parallel with receiving assistance data from the network. An additional benefit is that a shorter time required for time synchronisation means that the procedure is less susceptible to disruption due to cellular handovers (e.g. when the user travels by car, train, etc . . . ). Cellular handovers are disruptive because they can lead to reference time assistance data being received that is not related to the current cell. In contrast to prior art solution the present invention uses a comparator rather than a rollover mechanism to generate the timing strobe, which has the benefit that the existing circuitry and software used in GSM and WCDMA stacks for timing purposes can be reused in the fine time assistance synchronisation procedure and the strobe and comparator used for generation of the GPS timing strobe can be used for other purposes when the fine time assistance procedure is not carried out.

BRIEF DESCRIPTION OF THE DRAWINGS

The present invention will be understood and appreciated more fully from the following detailed description taken in conjunction with the drawings in which.

DESCRIPTION OF EMBODIMENTS OF THE INVENTION

The present invention is discussed herein below in the context of a GPS positioning system and Universal Time Coordinated (UTC) as a time system used by the GPS. However, it should be understood that it is not limited to GPS and UTC, but instead applies equally to other satellite positioning systems (e.g. Galileo and GLONASS) as well is to other reference time systems (or other standard time). It is worth to note, however, that GPS time is based on the UTC time but does not include leap seconds.

The term "starting-up" herein below relates to a process of powering-up of a device from switched-off state as welt as starting operation of the device from a stand-by state in which the device consumes reduced amount of energy.

The term "positioning device" herein below relates to a device that is adapted to determine its own location. It also covers devices which primary function is not determining location, e.g. mobile phones with GPS modules.

The term "telecommunications network" herein below relates to wireless networks designed to transmit voice and/or data, e.g. GSM, WCDMA, Professional Mobile Radio (e.g. TETRA) as well as to networks primarily designed to transmit data, e.g. WLAN (Wireless Local Area Network).

Figure 1:
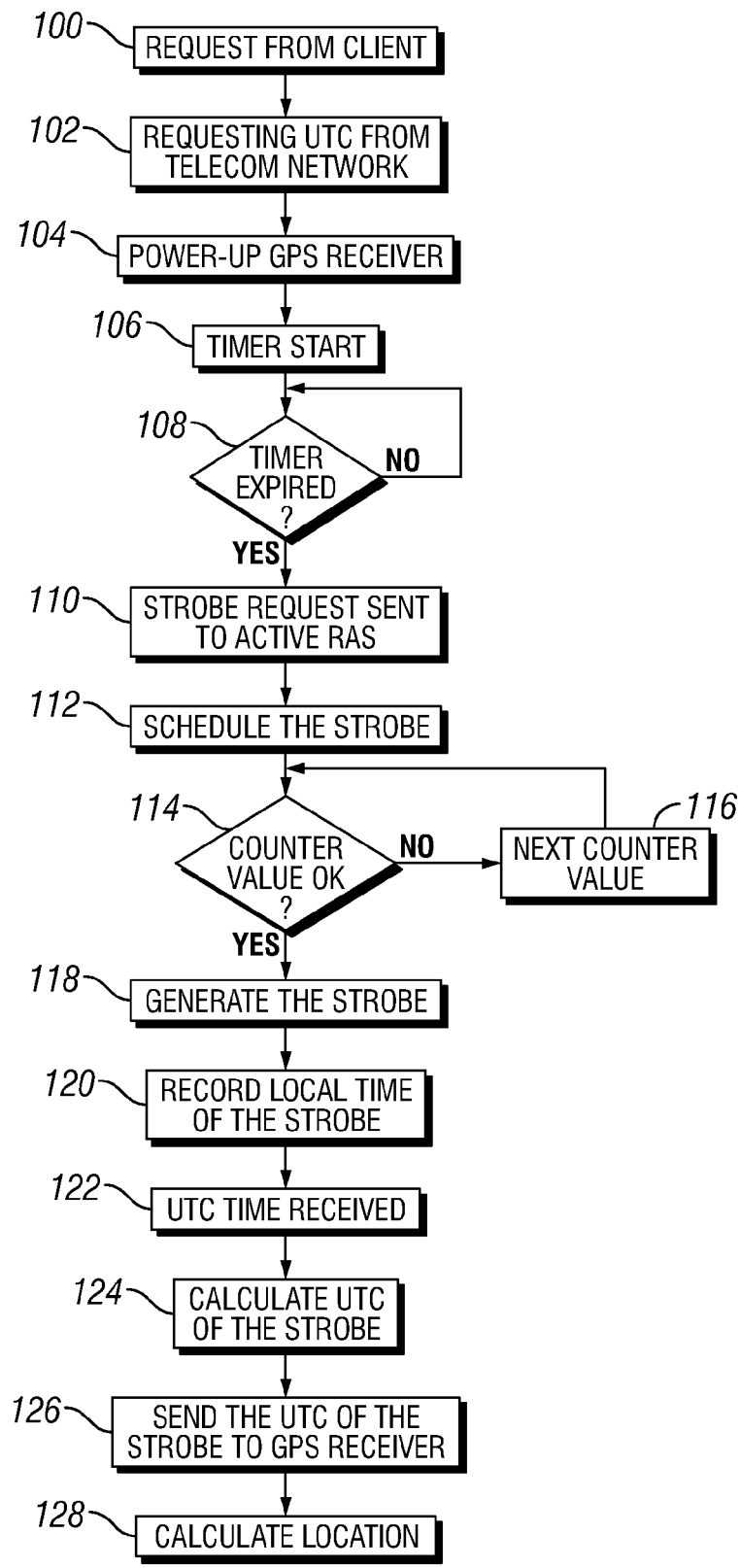
FIG. 1 is a flowchart illustrating a method of operating a positioning device in one embodiment of the present invention.
Figure 2:
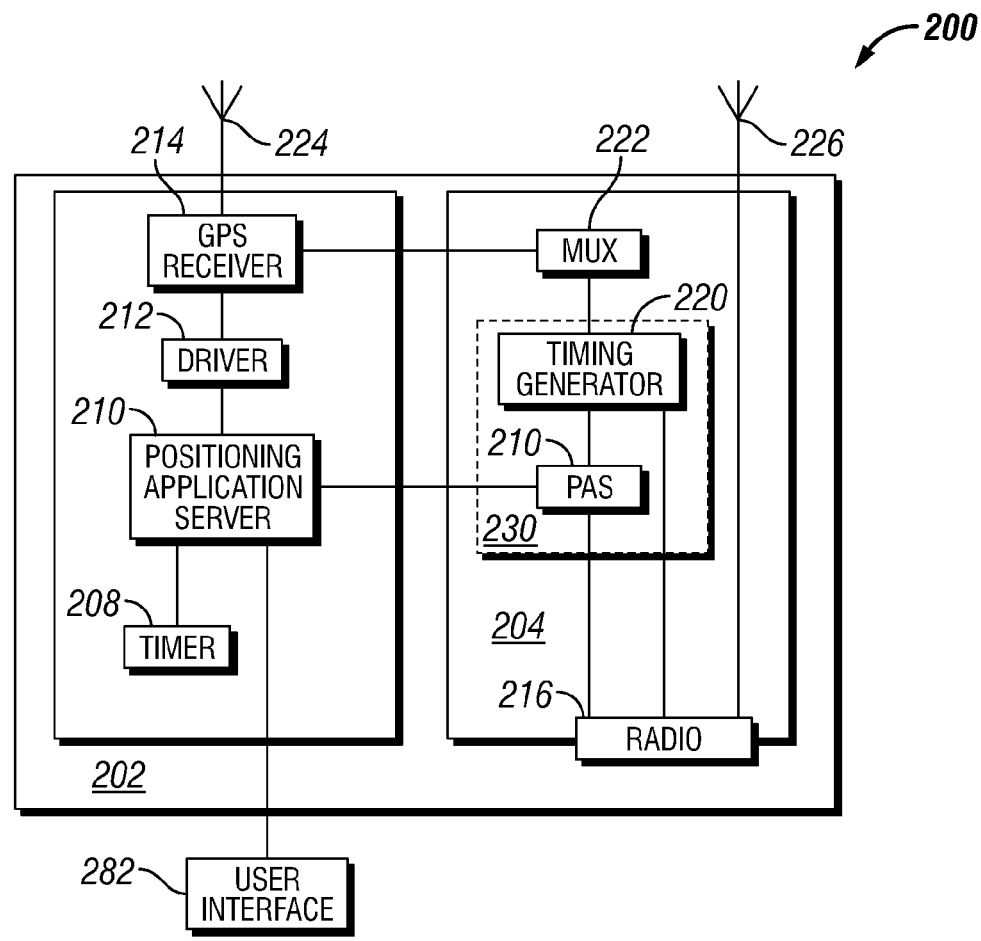
FIG. 2 is a diagram illustrating a device in one embodiment of the present invention.
Figure 3:
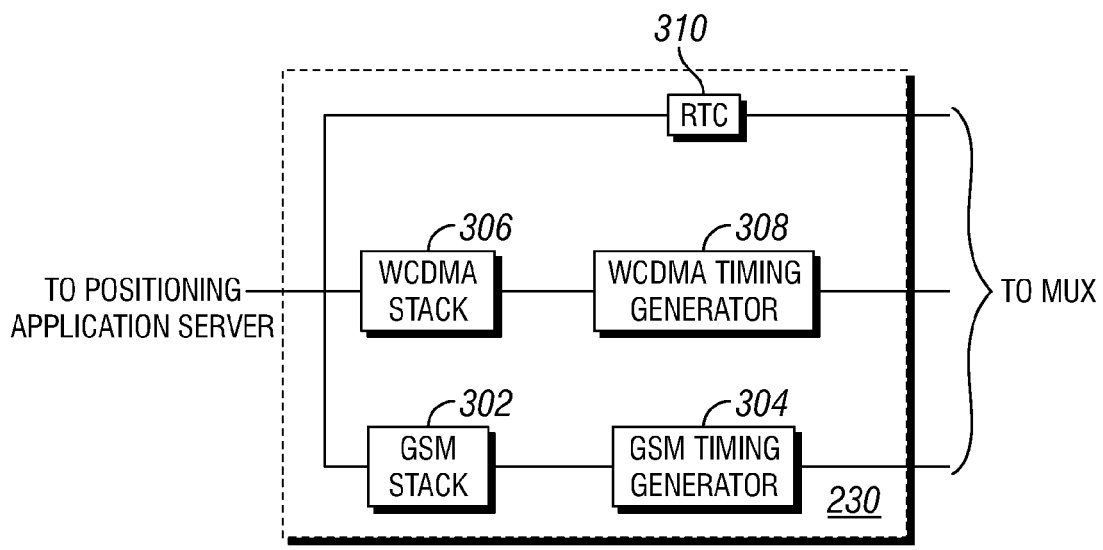
FIG. 3 is a diagram illustrating part of a telecommunications unit of one embodiment of the device according to the present invention.

With reference to FIG. 1, FIG. 2 and FIG. 3 a method of operating a device 200 is presented. For the sake of clarity the drawings present the invention in a very schematic way with elements and lines not essential for understanding the invention omitted.

In the presented embodiment the device 200 comprises a positioning unit 202 and a telecommunications unit 204. In order to calculate position of the device 200 it is necessary to synchronise the time of the GPS positioning unit 202 with the very accurate time reference of the GPS system. The Universal Time Coordinated (UTC) is used as the reference time of the atomic clock of the GPS satellite. The method of operation of the device 200 allows for synchronizing the time of the GPS unit 202 with time obtained via the telecommunication network rather than from a GPS satellite. This approach is known as fine time assistance or fine time aiding and allows for reducing the latency that is present when synchronising to satellite clock is carried out.

In one embodiment of the present invention the request to obtain position of the device 200 is received by a positioning application serer 210 and it comes from a client. The client is typically a user interface 228, for requests initiated by the user, or the network for requests initiated over the air (or example by a call center in emergency situations. Once the request for user equipment's 200 position is received by the positioning application server 210 said server requests 102, the fine time assistance, i.e. the UTC time, from a digital telecommunications network.

In a preferred embodiment the positioning application server 210 requests the telecommunications unit 204 to obtain time aiding from the network. The time aiding relates GPS time with the timing structure of the current cell to within 10 ms. Although the cellular base stations constantly broadcasts information that allows the mobile station to synchronise with the cell for communication purposes this information is not the UTC time used in GPS systems. In order to obtain the UTC time it has to be specifically requested. So called reference time value or fine time assistance data, or reference time assistance, or time aiding is requested and this data comprises a cellular time stamp, a cell identifier and a GPS time stamp. This information typically comes via the network from a Serving Mobile Location Centre (SMLC). The network/SMLC can "push" reference time assistance to the communication unit of the mobile station in response to the GPS enabled mobile station requesting its location. Alternatively the mobile station can request specific items of the reference time assistance data. These two types of requesting assistance data from the network can be used by the device 200 of the present invention. In either case the device 200 anticipates the reference time assistance data and schedules/generates the timing strobe before the reference time assistance data is received. This reduces latency, and mitigates the risk that the reference time assistance data when it eventually arrives relates to a cell that is no longer visible (or is no longer the serving cell).

Although assistance data is typically provided for the current cell. i.e. it provides the relationship between the current cell's timing and the GPS time, it is within contemplation of the present invention that in alternative embodiments the reference time assistance data used for synchronization of internal GPS receiver clock is provided for cell other than the current serving one.

Alternatively, if the telecommunications network does not support transmission of the required assistance data using the control plane then the data may be obtained from a server using Internet Protocol using for example the User Plane or a Wireless LAN network.

In the next step a positioning receiver, 214, is started-up 104. This step occurs before a response has been received to the aiding request. In devices that are not primarily designed to be used for determining position, e.g. mobile phones with GPS unit, the positioning receiver is switched-off when not in use in order to save power of the battery. In other devices, when determining location is performed more often than in mobile phones, or when the mobile phone with GPS unit is connected to an external source of power (e.g. charger in a car) the GPS positioning receiver 214 starts-up from a stand-by state in which reduced amount of energy is consumed. In the starting-up of the positioning receiver, 214, the positioning application server notifies a GPS device driver, 212, that the calculation of the position is requested and that the fine time assistance procedure will be attempted. The GPS device driver, 212, initiates the process of starting up the GPS no receiver, 214, which involves communication between the driver, 212, and the receiver, 214, using proprietary protocols over, for example, a I2C (Intel-Integrated Circuit) or UART (universal asynchronous receiver/transmitter) interface. This process can be quite slow and may take over 160 ms to complete.

In a preferred embodiment, substantially simultaneously with the starting-up 104 of the positioning receiver, 214, a timer, 208, is set 106 to trigger the next step. Once the timer expires, 108, a strobe request is sent, 110, to the currently active radio access stack 302 or 306. In a mobile phone adapted to communicate in more than one telecommunications system (e.g. GSM and WCDMA) more than one radio access stack is installed, 302, 306, but only one is active at a given time. The use of the timer, 208, ensures that the strobe will be generated and transmitted only when the positioning receiver, 214, is armed.

In an alternative embodiment the invention can operate without the timer. In this embodiment it is required that the strobe is generated after the GPS receiver-'s start-up procedure is finished. This may be implemented with GPS receivers that startup quickly or with very slow radio access stacks.

In order to simplify the description below the telecommunication unit 204, unless otherwise stated, is a GSM unit and comprises GSM radio access stack 302 and GSM timing generator. It is, however, within contemplation of the present invention that the considerations below are also applicable to WCDMA communications unit unless stated otherwise.

The GSM radio access stack schedules, 112, the strobe to occur at a specific point in a future multiframe. The strobe is transmitted from the telecommunications unit, 204, to the positioning receiver, 214. Said scheduling is accomplished by associating said strobe with a predefined value of a first counter.

Figure 4:
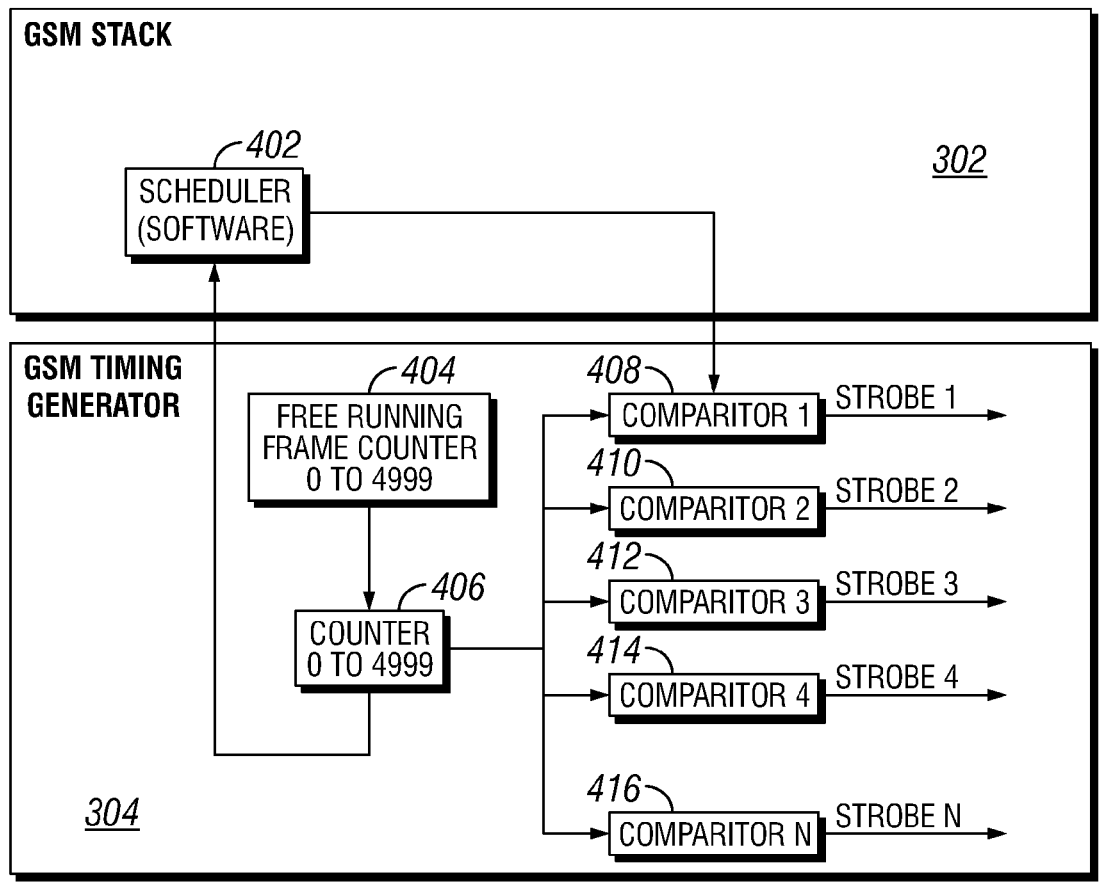
FIG. 4 is a diagram illustrating a GSM stack and a GSM timing generator of the device according to one embodiment of the present invention.
Figure 5:
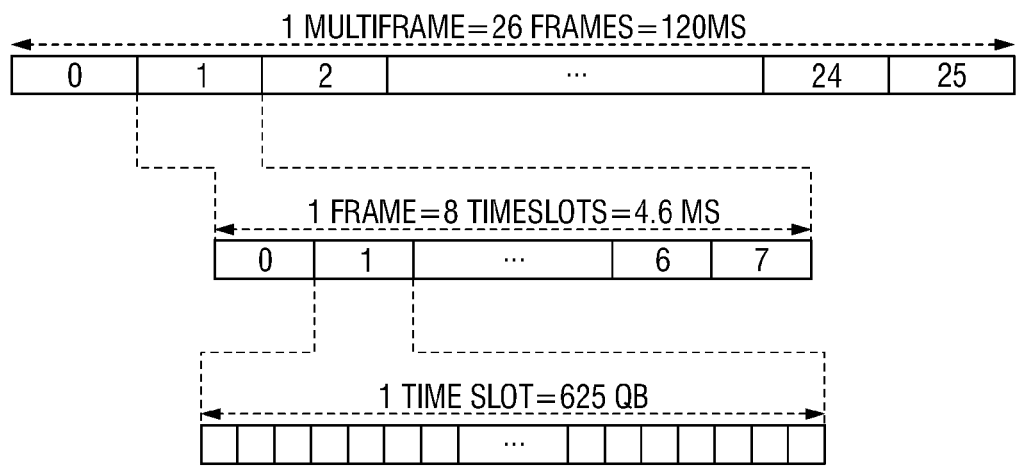
FIG. 5 is a diagram illustrating a GSM frame structure.

With reference to FIG. 4 and FIG. 5 the operation of the steps of scheduling and generation of the strobe will be explained. For GSM one of the fundamental units of timing is a frame, which lasts for approximately 4.6 ms (there are 26 frames in 120 ms multiframe). FIG. 5 and associated description below relates to GSM system only. A multiframe lasts for either 26 or 51 flames. Multiframes comprising 26 flames are used with traffic channels e.g. in a speech call, whereas multiframes comprising 51 frames are used with signalling channels for example in the setup phase before a call has been accepted or when there is no call. Multiframes are dealt with by a scheduled, 402, in software, which is part of GSM stack 302. Each frame is made up of 5000 quarter bits (QB) or 8 time slots, each one with 625 QB. All timings that are to a quarter bit resolution are dealt with by hardware using a hardware block called a timing generator 304. Within the timing generator, 304, there are two 0 to 4999 counters, a first counter 406 and a second counter 404 (the second counter 404 is a free running counter). The function of the second counter (free running), 404, is that all cell timings for "neighbour" GSM cells are recorded relative to it. The first counter, 406, in turn is synchronised to the current serving cell. Both counters 404 and 406 generate a software interrupt when they rollover and they rollover once per frame. The counters rollover once per frame, but they count QBs.

The scheduler, 402, in the GSM stack, 302, configures the comparators 408-416 to trigger at a specific time within a frame. The comparator, 414, compares, 114, 116, a current value of the first counter, 406, with said predefined value of the first counter, 406, and generates, 118, said strobe when said current value of the first counter, 406, equals said predefined value. When triggered they generate a signal on a strobe line. Most strobes are used to control the radio, 216, that is used for GSM communications and related cellular hardware blocks. One of the strobes, in the embodiment illustrated in FIG. 4, generated by the comparator 414 is transmitted to the GPS receiver 214. Practical realisation of the strobe generation, e.g. using buffers is a standard practice of a man skilled in the alt and will not be discussed here. Preferably, the predefined value of the first counter, which triggers the GPS strobe, corresponds to reception of the RX burst. The choice of a first counter value that corresponds to the RX burst has the advantage that it simplifies the calculations. The relationship between the timing of counters and the base stations cellular timing is optimized to simplify control of the radio and it varies depending on the radio channel currently in use and possibly calibration data for the radio. Generating the strobe at the time of an RX burst means that the UTC time of the strobe can be calculated without reference to calibration data or knowledge of the frequency of the radio channel. Knowledge of the allocated time slot is still required. Compensation for the round trip delay between the user equipment (UE) and the base station is typically performed by the network and/or the SMLC (Serving Mobile Location Centre).

In the next step the time of generation of said strobe is recorded, 120. The internal time is recorded in relation to a frame structure of the GSM signal processed by the CSM stack 302 with a quarter bit resolution.

When the communication unit, 204, operates in WCDMA system all clock values are determined and recorded in relation to a timing structure of the WCDMA frame with chip resolution.

After these steps are carried out the communications unit, 204, receives, 122, said UTC time value from said digital telecommunications network. Again the UTC time value is unambiguously related to a structure of the signal transmitted by said GSM telecommunications network with QB resolution and processed by the GSM stack.

In an alternative embodiment, when the communication unit operates in WCDMA network, the internal time and the UTC are associated with a frame structure of the WCDMA signal processed by the WCDMA radio access stack 306.

Because both the time of the strobe generation and the reference time assistance data are associated with frame structure of the same digital signal the reference time of generation of said strobe can be easily calculated, 124. In the next step, the calculated UTC time of generation of the strobe is transmitted, 126, to said positioning unit, 202. In one embodiment it is the GPS receiver, 214, that receives the calculated UTC of the strobe generation and in alternative embodiment it is the GPS device driver, 212, that has all the intelligence and therefore receives the calculated UTC of the strobe generation. Once the UTC of the strobe generation is known in the positioning unit 202 (either by the GPS receiver, 214, or GPS device driver, 212) the time of the positioning unit is synchronised with the reference time provided by the network. In the next step the positioning unit 202, calculates, 128, its position using GPS signal from at least three GPS satellites using the UTC time obtained from the GSM network. Again, the calculation of the position is performed by one of these two components (GPS receiver and GPS device driver) that has the processing power and software to do the calculations. In one embodiment it is GPS receiver 214 and in alternative embodiment it is the GPS device driver 212. The calculated position is then transmitted to the call center that initiated the fix or displayed on a display screen of the device, when the fix was initiated by the user. In the situation when the fix was initiated by the call center the calculated position can be sent to the call center and also displayed on the display screen.

In one alternative embodiment a comparator can be used with the second counter 404 for triggering the strobe. This would allow for using tine time assistance data provided for a neighbour cell rather than the current serving one. Using the free running counter 404 would simplify procedures involving neighbour cells especially in idle mode.

The device 200, as illustrated in one embodiment in FIG. 2 includes, although is not limited to, a positioning unit, 202, and a telecommunications unit, 204. In one embodiment the device is a mobile phone with a GPS unit, but it can also be a dedicated GPS positioning unit adapted to receive signals from a digital telecommunications network. In practice it means that the device 200 must have a module that identifies it in said digital telecommunications network, e.g. SIM card in case of mobile telephony network. The positioning unit, 202, comprises a GPS receiver, 214, and a positioning application server 210. In a simplest embodiment the communications unit 204 comprises only one radio access stack, e.g. GSM radio access stack 302. However, in more complex embodiments the communications unit, 204, comprises also a WCDMA radio access stack, 306, in addition to said GSM radio access stack 302. The positioning application server, 210, is connected to the GSM radio access stack 302. In more complex embodiment the positioning application server, 210, is connected to GSM and WCDMA radio access stacks, 302, 306. As it was explained earlier, in operation, only one of these two stacks can be active at a given time and the positioning application server, 210, communicates with this one of the stacks that is currently active. The same is applicable to solutions with even more than two radio access stacks. The request to determine position can be received from the digital telecommunications network, in this situation the signal is received over that air by a GSM antenna, 226, and via GSM radio 216 and GSM radio access stack 302 is received by the positioning application server, 210. Alternatively the request comes from the user of the device 200 and this in made by pressing a button on a keypad or touch-screen 228 also connected to said positioning application server, 210. A scheduler, 402 which is a software module comprised in said GSM radio access stack, 302, which is also software executed on a processor of the communication unit, 204, configures one of a bank of general purpose comparators, 408-416, of a GSM timing generator 304 to generate a strobe at a predefined value of a first counter 406. The GSM timing generator, 304, is connected to the GPS receiver, 214, and transmits the generated strobe to the positioning receiver over this connection. The GSM timing generator 304 also records in a register (not shown) the local time of generation or said strobe.

Although not shown in detail in the drawings the communications unit 204 comprises a controller, a receiving and transmitting circuitry connected via radio frequency switch to an antenna 226. The controller includes a processor and a memory. In one embodiment, said memory stores a program or a set of operating instructions for execution by the processor. The processor executes the program or the set of operating instructions such that the mobile station operates in a way that allows making and receiving calls, sending and receiving messages as well as using other services provided by the network and carrying the operations (or their part) according to the present invention. The communications unit comprises also other elements that are necessary for its proper operation, but their presence is clear for one skilled in the art and therefore the other elements are not discussed here. The same comment is applicable to the positioning unit 202 described herein and depicted in FIG. 2 with less important and obvious parts omitted. A real time clock (RTC) 310 is used in the communication unit for maintaining the current time of day and this provided to the user on a display. The RTC 310 may have also another function. According to an earlier patent application EP05112892.4 by the same applicant the RTC 310 can be used to calculate UTC and this calculated UTC is sent to the positioning unit 202 for determining position. This functionality my be used as a back-up for the present invention in the case of the user requesting determining position outside a range of network.

In one embodiment the positioning application server, 210, calculates the UTC time of said strobe generation using the recorded local time and the UTC time received from the network and then forwards it to the GPS device driver, 212, or to the GPS receiver, 214. Alternatively the calculation of the UTC time of the strobe generation is carried out by the GSM access stack, 203. The calculated value is then sent, as in the previously described embodiment, to the GPS device driver, 212, or to the GPS receiver, 214.

Said positioning unit, 202, calculates the location of the device 200 based on radio signals received from transmitters of a positioning systemic. It calculates its position using GPS signal from at least three GPS satellites and the UTC time obtained from the GSM network. The calculation of the position is performed either by the GPS receiver, 214, or by the GPS device driver, 212. In one embodiment it is GPS receiver, 214, that has the processing power and software to do the calculations and in an alternative embodiment it is the GPS device driver 212. It must be noted that the GPS device driver, 212, and the GPS receiver, 214, can be embodied in one hardware unit of in two separate hardware units.

In a preferred embodiment, the device, 200, comprises a timer, 208, connected to the positioning application server. The function or the timer, 208, is to trigger the scheduler, 402, to configure one of a bank of general purpose comparators, 408-416, for generation of the strobe. However, it is within the contemplation of the present invention that that the timer can also be connected to the GSM access stack, 302, and correctly trigger the scheduler, 402. The comparator, 414 and/or the strobe used in calculating UTC time for the GPS receiver can be used for other purposes, for example for controlling an audio codec, when the synchronisation with the UTC time is not in progress.

In the embodiment with more than one radio access stack, for example when the communication unit, 204, is adapted to operate in GSM and in WCDMA telecommunications systems, a multiplexer, 222, is connected between the timing generators 304, 308 said positioning receiver 214. The simpler embodiments with only one radio access stack do not require the multiplexer 222.

The invention can be implemented in any suitable form including hardware, software, software embedded in hardware (e.g. all integrated circuit incorporating at least some of the hardware elements of the device 200 and a software embedded in the integrated circuit for causing a the device 200 to carry out the method of the present invention) or any combination of these. The method of the invention can be implemented in a computer program product stored on a computer useable storage device for execution by a processor. Storage devices suitable for storing computer program instructions include all forms of non-volatile memory, including by way of example semiconductor memory devices, such as EPROM, EEPROM, flash memory devices, disks (e.g. hard disk drives, magneto-optical disks, CD-ROM and DVD-ROM disks).

The invention claimed is:

1. A method of operating a device, comprising a positioning unit and a telecommunications unit, the method comprising:
  a) requesting a reference time value from a digital telecommunications network;
  b) starting-up a positioning receiver;
  c) scheduling a strobe to be transmitted from the telecommunications unit to the positioning receiver by associating said strobe with a predefined value of a first counter;
  d) comparing a current value of the first counter in a comparator with said predefined value and generating said strobe when said current value of the first counter equals said predefined value;
  e) recording time of generation of said strobe in relation to a structure of the signal transmitted by said digital telecommunications network in the current serving cell;
  f) receiving said reference time value from said digital telecommunications network, wherein said reference time value is related to the structure of the signal transmitted by said digital telecommunications network in the current serving cell;

g) calculating accurate time of generation of said strobe based on said reference time value;

h) transmitting said accurate time of generation of said strobe to said positioning unit.

2. The method according to claim 1 further comprising calculation of location of the device based on radio signals received from positioning system transmitters.

3. The method according to claim 1, wherein substantially simultaneously with the starting-up of the positioning receiver a timer is started and after expiration of the timer the step of scheduling the strobe is executed.

4. The method according to claim 1, wherein the scheduling is carried out by a scheduler of a GSM radio access stack and the generation of the strobe is carried out by a GSM timing generator.

5. The method according to claim 4, wherein the time of generation of said strobe is recorded in relation to a timing structure of the GSM signal with a quarter bit resolution.

6. The method according to claim 1, wherein the scheduling is carried out by a scheduler of a WCDMA radio access stack and the generation of the strobe is carried out by a WCDMA timing generator.

7. The method according to claim 6, wherein the time of generation of said strobe is recorded in relation to a timing structure of the WCDMA signal with a chip resolution.

8. The method according to claim 1, wherein the predefined value of the first counter corresponds to reception of the RX burst.

9. The method according to claim 1, wherein requesting a reference time value from a digital telecommunications network is performed by a positioning application server.

10. The method according to claim 1, wherein the positioning system is a Global Positioning System.

11. A device comprising a positioning unit and a telecommunications unit, said positioning unit comprising a positioning receiver and a positioning application server connected to at least one radio access stack and upon a request to determine location said positioning application server is adapted to start-up the positioning receiver and request reference time from a digital telecommunications network, wherein a scheduler comprised in an active radio access stack is adapted, once the positioning receiver is operational, to configure a comparator of a timing generator connected to said active radio access stack to generate a strobe at a predefined value of a first counter and to transmit said strobe to the positioning receiver, the device is adapted to calculate an accurate time of said strobe generation based on local time of said strobe generation and the reference time received from the network to transmit said accurate time of generation of said strobe to said positioning unit, and said positioning unit is adapted to calculate the location of the device based on radio signals received from transmitters of a positioning system.

12. The device according to claim 11 further comprising a timer adapted to trigger the scheduler to configure the comparator for said strobe generation.

13. The device according to claim 11, wherein said Positioning Application Server is adapted to calculate the reference time of said strobe generation.

14. The device according to claim 11, wherein said radio access stack is adapted to calculate the reference time of said strobe generation.

15. The device according to claim 11, wherein said positioning receiver is adapted to calculate the location of the device based on radio signals received from transmitters of a positioning system.

16. The device according to claim 11, wherein said at least one radio access stack is a GSM stack and said timing generator is a GSM timing generator.

17. The device according to claim 11, wherein said at least radio access stack is a WCDMA stack and said timing generator is a WCDMA timing generator.

18. The device according to claim 11, wherein the communication unit comprises GSM stack and timing generator as well as WCDMA stack and timing generator.

19. The device according to claim 11 further comprising a multiplexer connected to the timing generators and to said positioning receiver.

20. The device according to claim 11, wherein the comparator is one of a bank of general purpose comparators.

21. The device according to claim 11, wherein the comparator and/or strobe are adapted to be used for other purposes when the method of claim 1 is not in progress.

22. The device according to claim 11 comprising a second counter, wherein said second counter is connected to one said bank of comparators.

23. A computer program product stored on a computer readable medium, adapted to be executed on a computerized apparatus comprising a positioning unit and a telecommunications unit wherein said computer program product, when executed on said computerized apparatus, is adapted to:

a) request a reference time value;

b) start-up a positioning receiver;

c) schedule a strobe to be transmitted from the telecommunications unit to the positioning unit by associating said strobe with a predefined value of a counter;

d) compare a current value of the counter in a comparator with said predefined value and to generate said strobe when said current value of the counter equals said predefined value;

e) record the time of generation of said strobe in relation to a structure of the signal transmitted by said digital telecommunications network in the current serving cell;

f) receive said reference time value from said digital telecommunications network, wherein said reference time value is related to the structure of the signal transmitted by said digital telecommunications network in the current serving cell;

g) calculate accurate time of generation of said strobe based on said reference time value;

h) transmit said accurate time of generation of said strobe to said positioning receiver.

24. The computer program product according to claim 23 further adapted to calculate the location of the device based on radio signals received From positioning system transmitters.

25. The computer program product according to claim 23, further adapted to substantially simultaneously with the starting-up of the positioning receiver to start a timer and after expiration of the timer to schedule the strobe.

* * * * *

UNITED STATES PATENT AND TRADEMARK OFFICE
CERTIFICATE OF CORRECTION

PATENT NO. : 7,750,845 B2
APPLICATION NO. : 12/046945
DATED : July 6, 2010
INVENTOR(S) : Lethbridge It is certified that error appears in the above-identified patent and that said Letters Patent is hereby corrected as shown below:

Title Page, Item (57), under "ABSTRACT", in Column 2, Lines 1-16, delete "A positioning unit and telecommunications unit......................said positioning unit." and insert -- A method of operating a device, comprising a positioning unit and a telecommunications unit, the method comprising requesting a reference time value from a telecommunications network, starting-up a positioning receiver. A strobe to be transmitted from the telecommunications unit to the positioning receiver is scheduled when the positioning receiver is armed. A current value of the counter is compared with a predefined value of the counter and said strobe is generated when said current value of the counter equals said predefined value. The time of generation of said strobe is then recorded in relation to a structure of the signal transmitted by said digital telecommunications network in the current serving cell. The reference time value from said telecommunications network is received, wherein said reference time value is related to a structure of the signal transmitted by said network. In the next step accurate time of generation of said strobe based on said reference time value is calculated and said accurate time of generation of said strobe is transmitted to said positioning unit. --, therefor.

In Fig. 4, Sheet 3 of 3, for Tag "408", delete "COMPARITOR" and insert -- COMPARATOR --, therefor at each occurrence in the Figure.

In Column 1, Line 11, delete "nodule," and insert -- module, --, therefor.

In Column 1, Line 51, delete "tong" and insert -- long --, therefor.

In Column 2, Lines 8-9, delete "synchronized)" and insert -- synchronized). --, therefor.

In Column 2, Line 15, delete "areas" and insert -- areas, --, therefor.

In Column 2, Line 41, delete "prefer-ably" and insert -- preferably --, therefor.

In Column 4, Line 24, delete "product" and insert -- product, --, therefor.

Signed and Sealed this

Sixteenth Day of November, 2010

David J. Kappos
*Director of the United States Patent and Trademark Office*

CERTIFICATE OF CORRECTION (continued)
U.S. Pat. No. 7,750,845 B2

In Column 4, Line 64, delete "invention." and insert -- invention; --, therefor.

In Column 5, Line 14, delete "is" and insert -- as --, therefor.

In Column 5, Line 19, delete "welt" and insert -- well --, therefor.

In Column 5, Line 51, delete "serer" and insert -- server --, therefor.

In Column 5, Line 53, delete "(or" and insert -- for --, therefor.

In Column 5, Line 56, delete "requests" and insert -- requests, --, therefor.

In Column 6, Line 47, after "GPS", delete "no".

In Column 6, Line 50, delete "(Intel-Integrated" and insert -- (Inter-Integrated --, therefor.

In Column 7, Line 22, delete "flames." and insert -- frames. --, therefor.

In Column 7, Line 22, delete "flames" and insert -- frames --, therefor.

In Column 7, Line 27, delete "scheduled," and insert -- scheduler, --, therefor.

In Column 7, Line 54, delete "alt" and insert -- art --, therefor.

In Column 8, Line 5, delete "CSM" and insert -- GSM --, therefor.

In Column 8, Line 32, delete "unit" and insert -- unit, --, therefor.

In Column 8, Line 51, delete "tine" and insert -- fine --, therefor.

In Column 9, Line 20, delete "402" and insert -- 402, --, therefor.

In Column 9, Line 29, delete "or" and insert -- of --, therefor.

In Column 10, Line 1, delete "systemic." and insert -- system. --, therefor.

In Column 10, Line 10, delete "of" and insert -- or --, therefor.

In Column 10, Line 13, delete "or" and insert -- of --, therefor.

In Column 10, Line 32, delete "all" and insert -- an --, therefor.

In Column 12, Line 29, in Claim 23, delete "unit" and insert -- unit, --, therefor.

In Column 12, Line 54, in Claim 24, delete "From" and insert -- from --, therefor.